(12) United States Patent
Palanisamy et al.

(10) Patent No.: US 8,064,601 B1
(45) Date of Patent: Nov. 22, 2011

(54) SECURITY IN WIRELESS COMMUNICATION SYSTEMS

(75) Inventors: Senthil Palanisamy, Cupertino, CA (US); Vaduvur Bharghavan, San Jose, CA (US)

(73) Assignee: Meru Networks, Sunnyvale, CA (US)

( * ) Notice: Subject to any disclaimer, the term of this patent is extended or adjusted under 35 U.S.C. 154(b) by 939 days.

(21) Appl. No.: 11/396,400

(22) Filed: Mar. 31, 2006

(51) Int. Cl.
*H04L 9/00* (2006.01)

(52) U.S. Cl. ........ 380/270; 380/359; 380/370; 380/375; 380/455; 380/255; 713/151; 713/160; 713/161

(58) Field of Classification Search .................. 713/151, 713/160, 161; 380/270, 359, 370, 455, 255
See application file for complete search history.

(56) References Cited

U.S. PATENT DOCUMENTS

| | | | |
|---|---|---|---|
| 5,038,151 A | 8/1991 | Kaminski | |
| 5,177,788 A * | 1/1993 | Schanning et al. | 713/162 |
| 5,966,094 A | 10/1999 | Ward et al. | |
| 6,728,603 B2 * | 4/2004 | Pruzan et al. | 701/1 |
| 6,760,318 B1 | 7/2004 | Bims | |
| 6,788,658 B1 | 9/2004 | Bims | |
| 6,839,038 B2 | 1/2005 | Weinstein | |
| 6,894,649 B2 | 5/2005 | Ostervall | |
| 6,933,909 B2 | 8/2005 | Theobold | |
| 6,954,177 B2 | 10/2005 | Channabassapa et al. | |
| 6,978,158 B2 | 12/2005 | Ghavami | |
| 7,194,008 B2 * | 3/2007 | Chu et al. | 370/465 |
| 7,319,685 B2 | 1/2008 | Kim et al. | |
| 7,333,455 B1 | 2/2008 | Bolt et al. | |
| 7,359,362 B2 | 4/2008 | King et al. | |
| 7,630,402 B2 * | 12/2009 | Un et al. | 370/469 |
| 7,843,910 B2 * | 11/2010 | Loughran et al. | 370/389 |
| 2002/0060995 A1 * | 5/2002 | Cervello et al. | 370/332 |
| 2002/0112008 A1 * | 8/2002 | Christenson et al. | 709/206 |
| 2004/0235453 A1 * | 11/2004 | Chen et al. | 455/410 |
| 2005/0152314 A1 | 7/2005 | Sun et al. | |
| 2006/0215691 A1 * | 9/2006 | Kobayashi et al. | 370/466 |
| 2006/0221993 A1 * | 10/2006 | Liao et al. | 370/449 |

OTHER PUBLICATIONS

Habib et al. "Multi-antenna techniques for OFDM based WLAN." Proceedings of First International Conference on Next-Generation Wireless Systems, Jan. 2006, pp. 186-190.
Kitahara et al. "A base station adaptive antenna for downlink transmission in a DS-CDMA system." IEEE 51st Vehicular Technology Conference Proceedings, 2000 (Abstract).
Mahler et al. Design and optimisation of an antenna array for WiMAX base stations. IEEE/ACES International Conference on Wireless Communications and Applied Computational Electromagnetics, 2005 (Abstract).
Miaris et al. "On the base stations antenna system design for mobile communications." Electrical Engineering, 2006, pp. 157-163, vol. 88.

(Continued)

*Primary Examiner* — Vivek Srivastava
*Assistant Examiner* — Helai Salehi
(74) *Attorney, Agent, or Firm* — Swernofsky Law Group PC (57) ABSTRACT

Wireless security is enforced at L1, in addition to or in lieu of other layers. AP's can switch dynamically from serving to scanning. Scanners listen for authorized frame headers. Scanners either receive, or allow authorized frames to be received, at their destination. Scanners kill unauthorized frames while they are still transmitting; scanners continue listening for and killing unauthorized frame headers until frame ending time demands their return to serving, multiplying their effectiveness. AP's include dual-mode multi-frequency omni-directional antennae, used to prevent third parties from snooping messages received at those AP's.

9 Claims, 3 Drawing Sheets

OTHER PUBLICATIONS

Miura et al. "Study of array pattern tuning method using hybrid genetic algorithms for figure-8 satellite's earth station antenna." Asia-Pacific Microwave Conference Proceedings, 2000 (Abstract).

Ponnapalli et al. "Design and packaging of antennas for wireless systems." Proceedings of Electrical Performance of Electrical Packaging, 1995 (Abstract).

Sarolic. "Base station antenna near-field radiation pattern distortion analysis." Sixth International Conference on Computational Methods for the Solution of Electrical and Electromagnetic Engineering Problems Incorporating Electromagnetic Effects on Human Beings and Equipment Seminar, 2003 (Abstract).

* cited by examiner

SECURITY IN WIRELESS COMMUNICATION SYSTEMS

BACKGROUND OF THE INVENTION

In wireless communication, devices can send and receive messages without being physically coupled. Wireless devices (sometimes called "mobile units" or "MU's") can include portable computers, telephones, location sensors (such as those using GPS), and the like. Portable computers with wireless communication capability can be coupled to a computer network, such as the Internet or the World Wide Web.

The IEEE 802.11 standard (including 802.11a, 802.11b, and 802.11g) is one known technique for coupling MU's to a computer network. In 802.11, MU's seek out and select "access points" (sometimes called "AP's"), which are themselves physically coupled, for computer communication, to at least a network controller. Each MU associates itself with a particular AP, with which it communicates. Each MU (which might move before, during, or after communication) determines from time to time if it has good communication with its associated AP, and whether it would have better communication with a different AP. Each AP might be coupled to a single device, a collection of devices, or to a computer network.

In alternative embodiments, MU's might communicate directly without using intermediate AP's or system infrastructure. This form of MU-to-MU communication is sometimes referred to herein as a "peer-to-peer" or an "ad hoc" mode of communication between MU's. As described below, security in wireless communication systems should also protect against peer-to-peer modes of communication involving unauthorized devices.

Wireless communication is subject to use by unauthorized (sometimes called "bad" or "rogue") devices. Rogue devices might include AP's or MU's.

There are at least three types of "active" rogue attacks, that is, rogue attacks that involve communication by the rogue device with at least some elements of the wireless communication system.

Rogue devices might use communication capacity and channels that are otherwise usable by the system. This is sometimes referred to herein as "consuming RF capacity". That is, the rogue device might not be coupled to the wireless communication system, but might interfere with operation of that wireless communication system by using its airtime or other resources.

Rogue devices might draw away legitimate client devices of the wireless communication system and provide services to them. This is sometimes referred to herein as "hijacking clients". Services provided by the rogue device might or might not be legitimate, and might or might not be inimical to either the serviced device or to the wireless communication system itself.

Rogue devices might become coupled to the backbone network used by the wireless communication system. This is sometimes referred to herein as "unauthorized connection to the backbone system". That is, a rogue device might be coupled to the wireless communication system's backbone network and become enabled to communicate with (possibly unauthorized) other devices.

There are also at least three types of "passive" rogue attacks, that is, rogue attacks that involve listening by the rogue device to messages in the wireless communication system.

Rogue devices might obtain knowledge of the location of users of the wireless communication system. This can possibly be obtained by listening to messages to or from that user, and deducing its location by the strength and destination of messages. This has the effect that the user's location, and possibly identity, can become compromised by a passive rogue attack.

Rogue devices might obtain knowledge of the application(s) used by users of the wireless communication system. For example, applications might include one or more of: file transfer, interactive voice, video downloading, web access, and the like. This can possibly be obtained by listening to messages to or from that user, and deducing its current application location by analysis of its traffic profile. This has the effect that the user's activity, and possibly identity and the nature of that user's work, can become compromised by a passive rogue attack.

Rogue devices might obtain knowledge of the data in message sent to or from users of the wireless communication system, for example, by listening to (sometimes referred to herein as "snooping") those messages and decrypting their content.

Known methods of enforcing security in a wireless communication system are subject to several problems.

A 1st known issue is that policing a wireless communication system against rogue devices can be evaded by those unauthorized devices.

In known methods, removing rogue devices from the system takes relatively large amounts of airtime and communication capacity, with the effect that aggressive rogue devices can use substantial communication capacity just by their presence.

In known methods, AP's cannot conveniently or easily both scan for rogue devices and service authorized devices. That is, removing rogue devices involves using AP's to scan for those rogue devices instead of servicing authorized devices, with the effect that providing security can either (1) use more AP's for greater security and greater expense, or (2) use fewer AP's for lesser expense and lesser security, neither of which is entirely satisfactory. This has the effect that AP's cannot conveniently or easily ameliorate the presence of rogue devices.

In known methods, rogue devices can ignore messages intended to remove them from the system. This has the effect AP's cannot conveniently or easily remove rogue devices that deliberately ignore anti-rogue protocol messages.

In known methods, rogue devices can passively snoop authorized messages without substantial notice by security procedures intended to remove them from the system. This has the effect that AP's are not able to conveniently or easily prevent rogue devices from obtaining substantial unauthorized information.

SUMMARY OF THE INVENTION

The invention includes techniques for enforcing security in wireless communication systems at an L1 layer, preferably in addition to, but possibly in lieu of, enforcing security at other layers. AP's are capable of both servicing authorized devices, and when not servicing, scanning for rogue devices (possibly on multiple channels). AP's are also capable of both servicing authorized devices on one channel and scanning for rogue devices on other channels. Rogue devices are detected, isolated (sometimes called "quarantined"), and expelled from the system with substantially no communication overhead. AP's can also prevent rogue devices from passive listening to messages by jamming L1 protocol messages for substantially all devices except the sender and receiver.

In an aspect of the invention, L1 protocol messages (sometimes called "frames") include a frame header and a frame payload. Scanning AP's, in hearing range of those frames, listen to the frame header and determine if that frame is authorized or not. If authorized, the scanning AP either receives the frame or allows the frame to be received by its destination AP. If not authorized, the scanning AP kills the frame, for example, by inserting a noise spike in a portion of the frame payload. In a preferred embodiment, frame payloads (which can vary from about 400 microseconds at about 54 Mbps, to about 5,000 microseconds at about 2 Mbps) are substantially longer than frame headers (which can vary from about 50 at about 54 Mbps, to about 150 microseconds at about 2 Mbps), with the effect that after reading and parsing the frame header, scanning AP's have enough time to determine whether or not to kill the frame during the frame payload.

In an aspect of the invention, scanning AP's need not be distinct from serving AP's. For a $1^{st}$ example, if the interference zones of two AP's intersect at a particular MU, at least one of those two AP's must be silent when that MU is receiving or sending. The other AP can switch dynamically from serving to scanning. For a $2^{nd}$ example, if an AP hears a frame from a rogue device, it can switch dynamically from serving to killing frames from that rogue device. This has the additional effect of also killing all IEEE beacons and probes from the rogue device, with the effect that rogue AP's become invisible to their clients, and rogue clients become invisible to all AP's.

In an aspect of the invention, scanning AP's need not stop scanning after detecting a rogue frame. If a scanning AP, after killing a rogue frame, has sufficient time to keep scanning for one or more additional frame headers, that AP can continue scanning, with the effect of providing scanning capacity equivalent to multiple scanning AP's. In a preferred embodiment, the frame header indicates the length of the frame, so the scanning AP knows the time when it must return to serving.

In an aspect of the invention, each AP might include a dual-mode (receive and transmit) multi-frequency omni-directional antenna, with the effect that when an AP receives a frame, it can assure that no other AP or MU within hearing distance of the receiving AP receives that frame. Receiving AP's identify frames as directed to them as recipients. They receive the frame data themselves at the receive portion of the antenna, and insert a noise spike from the transmit portion of the antenna. This has the effect that only the receiving AP itself can hear the frame data. (Even the sending AP or MU cannot hear the frame data, but it already knows what it is sending and thus does not even listen to the frames it sends.)

GENERALITY OF THE DESCRIPTION

This application should be read in the most general possible form. This includes, without limitation, the following:

References to specific structures or techniques include alternative and more general structures or techniques, especially when discussing aspects of the invention, or how the invention might be made or used.

References to "preferred" structures or techniques generally mean that the inventor(s) contemplate using those structures or techniques, and think they are best for the intended application. This does not exclude other structures or techniques for the invention, and does not mean that the preferred structures or techniques would necessarily be preferred in all circumstances.

References to $1^{st}$ contemplated causes and effects for some implementations do not preclude other causes or effects that might occur in other implementations, even if completely contrary, where circumstances would indicate that the it contemplated causes and effects would not be as determinative of the structures or techniques to be selected for actual use.

References to $1^{st}$ reasons for using particular structures or techniques do not preclude other reasons or other structures or techniques, even if completely contrary, where circumstances would indicate that the $1^{st}$ reasons and structures or techniques are not as compelling. In general, the invention includes those other reasons or other structures or techniques, especially where circumstances indicate they would achieve the same effect or purpose as the $1^{st}$ reasons or structures or techniques.

After reading this application, those skilled in the art would see the generality of this description.

DEFINITIONS

The general meaning of each of these following terms is intended to be illustrative and in no way limiting.

The phrase "access point", the term "AP", and the like, generally refer to devices capable of wireless communication with mobile units, and capable of wireline communication with other devices. In preferred embodiments, AP's communicate with external devices using a L2/L3 network. However, in the context of the invention, there is no particular requirement that AP's have an actual wireline communication link; AP's might communicate entirely wirelessly.

The phrase "multiple radio", and the like, generally refers to devices capable of wireless communication with mobile units while using multiple antennae, frequencies, or both.

The phrase "L1 layer", and the like, generally refers to the L1 layer in a communication network in accordance with the ISO/OSI model. The L1 layer generally includes encoding and signaling techniques, as distinguished from hardware sending and receiving techniques (Lo), such as actual bit encodings on signal media.

While the L1 layer is also generally distinguished from packet sending and receiving techniques (L2), such as those using a MAC address on a LAN, a preferred embodiment of the invention uses that MAC address in the course of determining whether a frame is from or to an authorized user or a rogue device. However, in the context of the invention, it is true both (1) there is no particular requirement for this form of detecting rogue devices, and (2) where an L1 layer is described there is no particular requirement for any particular type of encoding or signaling technique. For example, although a preferred embodiment is described with reference to wireless communication, applicability of the invention to wire-line systems, such as Ethernet-type LAN's would also be workable, and are within the scope and spirit of the invention.

The phrase "L2/L3 network", and the like, generally refers to a communication network in which data packets are transmitted in accordance with the ISO/OSI model. In preferred embodiments, an L2 network includes a LAN, such as an Ethernet-type LAN, while an L3 network includes a packet-switched network, such as multiple LAN's coupled using bridges or routers. However, as noted below, in the context of the invention, where an L2/L3 network is described there is no particular requirement for any particular type of network, whether designated as an L2/L3 network or otherwise.

The phrases "mobile unit", the term "MU", the phrases "mobile unit", "wireless device", and the like, generally refer to devices capable of wireless communication with AP's. In preferred embodiments, wireless devices implement a wireless communication standard such as IEEE 802.11a, 11b, or 11g. However, in the context of the invention, there is no particular requirement (1) that this particular communication standard is used, for example, the wireless communication might be conducted according to a standard other than 802.11, or even according to a an IEEE standard entirely, or (2) that all wireless devices each use the same standard or even use inter-compatible communication standards.

The phrase "wireless communication", and the like, generally refers to radio communication in a region of spectrum allocated for that purpose, or for unlicensed use. In preferred embodiments, wireless communication includes a wireless communication standard such as IEEE 802.11a, 11b, or 11g. However, in the context of the invention, there is no particular requirement that wireless communication must necessarily (1) use radio spectrum, (2) use electromagnetic communication, or even (3) be entirely confined to untethered communication coupling.

For a $1^{st}$ example, after reading this application, those skilled in the art would recognize that techniques described herein regarding noise spikes, frame disruption, and micro-jamming, might be used in conjunction with a substantially wire-line system, such as an Ethernet-like system, or with a substantially wire-line portion of a communication system.

For a 2nd example, after reading this application, those skilled in the art would recognize that techniques described herein need not be limited to TDMA broadcast systems, and might also be used in conjunction with CDMA broadcast systems, WDM (wave division multiplexing) broadcast systems, and the like, or with such portions of a communication system.

The scope and spirit of the invention is not limited to any of these definitions, or to specific examples mentioned therein, but is intended to include the most general concepts embodied by these and other terms.

System Elements

Figure 1:
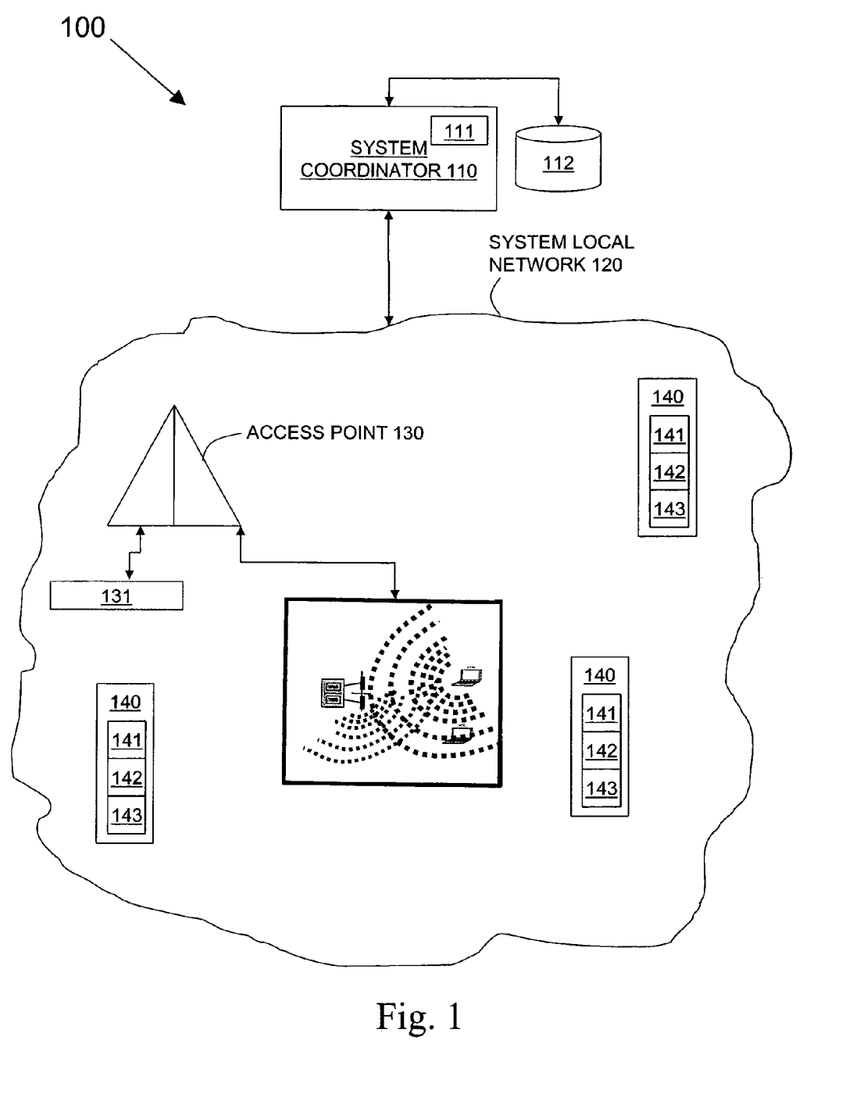
FIG. 1 shows a conceptual diagram of a wireless communication system including security.

FIG. 1 shows a conceptual diagram of a wireless communication system including secucity.

Communication System

One embodiment of a system 100 includes elements shown in the figure, including at least the following:

| | |
|---|---|
| A system coordinator 110 | A system local network 120 |
| A set of access points (AP's) 130 | A set of mobile units (MU's) 140 |

The system coordinator 110 includes elements shown in the figure, including at least the following:

| | |
|---|---|
| A coordinator circuit 111 | A coordinator database 112 |

The coordinator circuit 111 includes a computing device, such as a processor, program and data memory, and optionally mass storage. In cases in which the coordinator circuit 111 includes a programmable computing device, it also operates under control of software, optionally distinguished as operating system software and application software.

The coordinator database 112 includes information relating to the status of the system 100, its access points (AP's) 130, and its mobile units (MU's) 140. The coordinator circuit in operates with the coordinator database 112 to perform functions described below. These functions include at least the following:

| | |
|---|---|
| Directing AP's 130 to service particular channels | Directing AP's 130 to scan particular channels for rogue devices |
| Informing AP's 130 which wireless devices are valid users of the system 100 | Informing AP's 130 which wireless devices are rogue devices |

The system local network 120 includes any technique for sending and receiving information between the system coordinator 110 and the AP's 130. In a $1^{st}$ set of preferred embodiments, the system local network 120 includes an L2/L3 network, capable of substantially reliably communicating data packets between the system coordinator 110 and the AP's 130. However, in the context of the invention, there is no particular requirement for using this technique.

Each MU 140 includes elements shown in the figure, including at least the following:

| | |
|---|---|
| A device control circuit 141 | A transmitter 112 |
| A receiver 143 | |

In a $1^{st}$ set of preferred embodiments, the device control circuit 141 includes a computing device preprogrammed to implement one or more of the IEEE 802.11a, 11b, or 11g protocols, and includes one or multiple radios. One example of a mobile unit could be a telephone or mobile computer preprogrammed to operate in a wireless environment.

However, in the context of the invention, there is no particular requirement that the device control circuit 141 must be preprogrammed; it may instead include programmable memory, data memory, and optionally mass storage. One example of this distinct type of mobile unit could be a mobile computer, programmable to discover its wireless environment and operate therein.

Access Points

In a preferred embodiment, each access point (AP) 130 includes elements shown in the figure, including at least the following:

| | |
|---|---|
| An AP control circuit 131 | A dual-mode multifrequency transmit-receive antenna 132 |

The AP control circuit 131 includes a computing device, such as a processor, program and data memory, and optionally mass storage. In cases in which the AP control circuit 131 includes a programmable computing device, it also operates under control of software, optionally distinguished as operating system software and application software.

In a sending portion of the AP 130, the AP control circuit 131 determines which signals it desires to send and on what frequencies, multiplexes those signals onto those frequencies, and sends those multiplexed signals to the antenna 132. The antenna 132 broadcasts those multiplexed signals using wireless communication.

Similarly, in a receiving portion of the AP 130, the antenna 132 receives signals substantially omni-directionally using wireless communication. The AP control circuit 131 de-multiplexes those signals from those frequencies, and parses and examines those signals as they are received.

Figure 2:
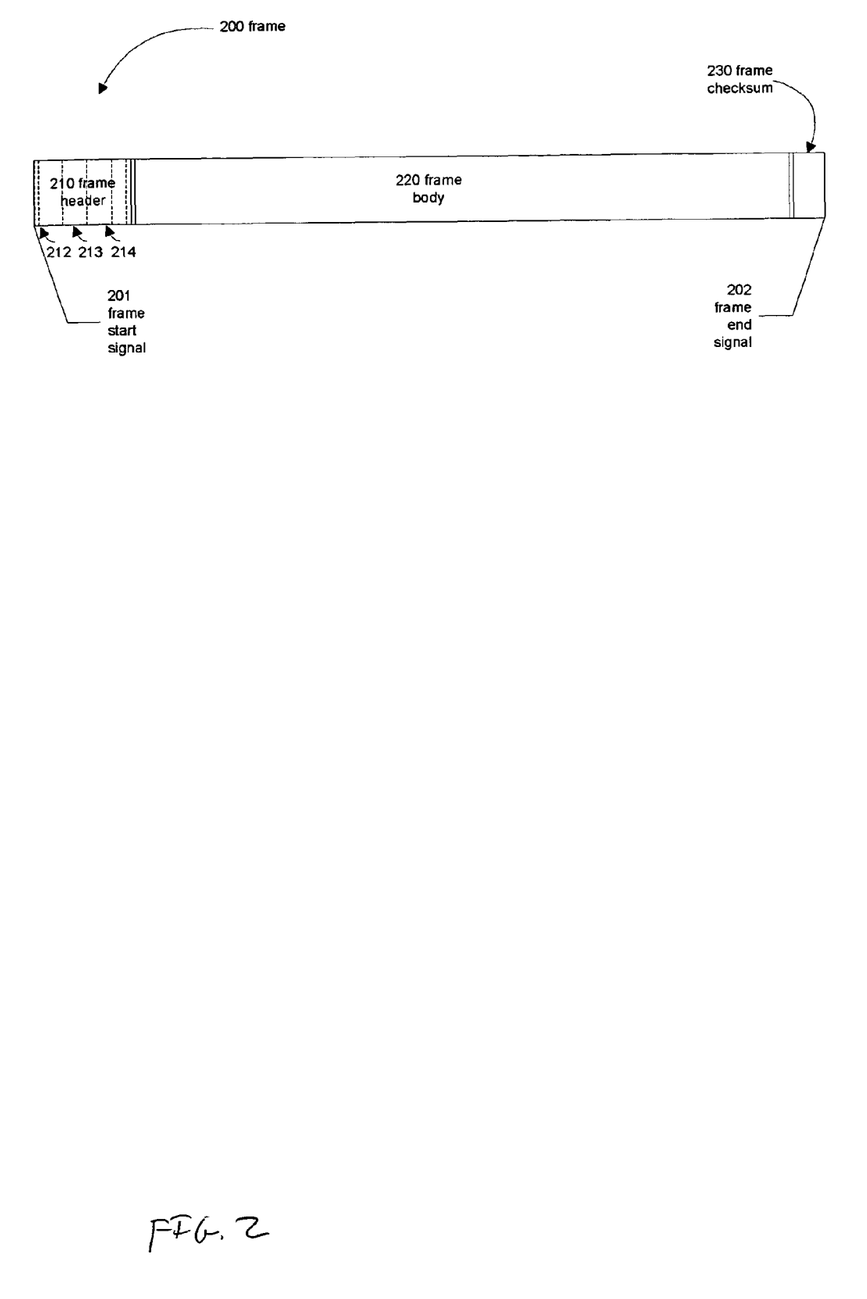
FIG. 2 shows a timing diagram of a wireless communication frame.

In the context of the invention, there is no particular requirement that the antenna 132 needs to be dual-mode or multi-frequency (as described herein) for scanning and jamming by the AP 130. For example, the AP 130 might receive the frame header 210 (as described herein) using any appropriate antenna 132, and transmit using any appropriate antenna 132 to create a noise spike in the frame payload 220 (as described herein).

In a preferred embodiment, the dual-mode features of the antenna 132 are used in conjunction with micro-jamming techniques (as described herein). Each part of the antenna 132 either sends or receives. When the AP 130 receives a frame 200, it receives that frame 200 using a $1^{st}$ portion of the antenna 132, and performs micro jamming using a $2^{nd}$ portion of the antenna 132. This has the effect that micro-jamming can proceed concurrently with receiving.

Timing Diagram

FIG. 2 shows a timing diagram of a wireless communication frame.

A wireless communication frame 200 includes elements as shown in the figure, including at least the following:

| A frame start signal 201 | A frame header 210 |
| A frame payload 220 | A frame checksum 230 |
| A frame end signal 202 | |

The frame start signal 201 indicates the beginning of the frame 200. In a preferred embodiment, the frame start signal 201 might include a "guard time" between a previous frame 200 and this particular frame 200.

Similarly, the frame end signal 202 indicates the end of the frame 200. Similarly, in a preferred embodiment, the frame end signal 202 might include a "guard time" between this particular frame 200 and a next frame 200.

Each frame header 210 includes elements as shown in figure, including at least the following:

| A frame header start signal 211 | A destination indicator 212 |
| A source indicator 213 | A frame length indicator 214 |
| A frame header end signal 215 | |

Similarly to the frame 200, the frame header 210 includes a frame header start signal 211 that indicates the beginning of the frame header 210. In a preferred embodiment, the frame header start signal 211 might include a "guard time" between the beginning of the frame and the beginning of the frame header 210.

The destination indicator 212 identifies a device to which this particular frame 200 is intended to be delivered. In a preferred embodiment, the destination indicator 212 includes a MAC address, such as a six octet (six byte) code, uniquely identifying the destination device.

The source indicator 213 identifies a device from which this particular frame 200 was sent. In a preferred embodiment, the source indicator 213 includes a MAC address, such as a six octet (six byte) code, uniquely identifying the sending device.

The frame length indicator 214 identifies the length of the frame 200, in a standardized measure. In a preferred embodiment, the frame length indicator 214 identifies a number of octets (bytes) between the end of the frame header 210 and the end of the frame 200.

Similarly to the frame 200, the frame header and signal 215 indicates the end of the frame header 210. Similarly, in a preferred embodiment, the frame header end signal 215 might include a "guard time" between the end of the frame header 210 and the beginning of the frame payload 220.

The frame payload 220 includes data to be delivered to the destination device from the source device.

The frame checksum 230 includes a checksum or other redundant information, with the effect that the destination device can confirm that it has properly received the frame 200.

Methods of Operation

Figure 3:
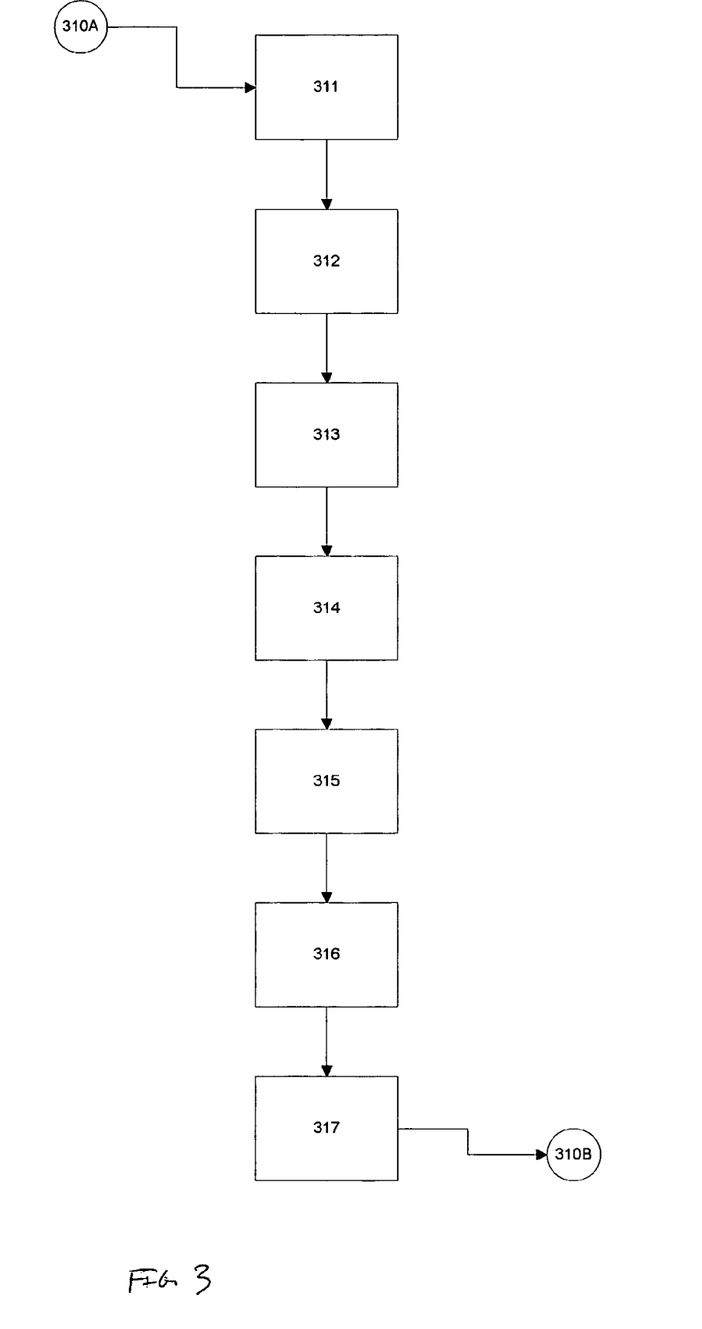
FIG. 3 shows a process flow diagram of a method of operating a wireless communication system including security.

FIG. 3 shows a process flow diagram of a method of operating a wireless communication system including security.

A method 300 includes a technique for scanning and possibly intercepting frames 200 that have been generated by rogue devices. This method 300 includes flow points and steps shown in the figure, including at least the following:

| A flow point 310A, defining a beginning of the method 300 | A step 311, at which an AP 130 begins scanning a particular channel |
| A step 312, at which the AP 130 receives information from the controller 120 identifying rogue devices | A step 313, at which the AP 130 receives the frame header 210 of a particular frame 200 on that channel |
| A step 314, at which the AP 130 parses the frame header 210 of that frame | A step 315, at which the AP 130 compares the destination indicator 212, and the source indicator 213 with its list of identified rogue devices |
| A step 316, at which the AP 130 inserts a "noise spike" into the frame payload 220, of the particular frame | A step 317, at which the AP 130 determines whether it has time to continue scanning before the particular frame 200 is over |
| A flow point 310B, defining an end of the method 300 | |

A flow point 310A defines a beginning of the method 300.

At a step 311, the AP 130 completes servicing a particular channel, and is ready to scan that channel for rogue devices while other AP's 130 are using that channel.

At a step 312, the controller 120 sends, and the AP 130 receives, information identifying which devices are valid users of the system 100, and which devices are rogue devices. In the context of the invention, there is no particular requirement that this step need be performed all at once. For example, the AP 130 might consult with the controller from time to time regarding those devices it spots, to ask if those devices are authorized or are rogue devices.

And a step 313, the AP 130 scans that channel until it receives the beginning of a frame 200 on that channel, or until a selected "dwell" time elapses. Techniques for determining an amount of time to scan before scanning another channel already exist; in the context of the invention, there is no particular requirement or advantage any one such technique, and those skilled in the art would be able to select an appropriate technique without new invention or undue experiment. As part of this step, the AP 130 receives the frame header 210 from the frame 200.

At a step 314, the AP 130 parses that frame header 210, with the effect of identifying the destination indicator 212, the source indicator 213, and the frame length indicator 214.

At a step 315, the AP 130 compares the destination indicator 212 with its list of identified rogue devices. Similarly, as part of this, the AP 130, compares the source indicator 213, with its list of identified rogue devices. As a result of this step, the AP 130 can determine if the frame 200 should be allowed to proceed within the system number 100.

If the AP 130 determines that the frame 200 should be allowed to proceed within the system; that is, the AP 130 does not wish to destroy the frame 200, the method 300 skips the next step.

If the AP 130 determines that the frame 200 should not be allowed to proceed within the system; that is, the AP 130 wishes to destroy the frame 200, the method 300 proceeds with the next step.

At a step 316, the AP 130 inserts a "noise spike" into the frame payload 220, with the effect that frame 200 is destroyed. In a preferred embodiment, the "noise spike" is any frame or partial frame with the effect of destroying the frame 200. In the context of the invention, there is no particular requirement that the "noise spike" need include "noise" (as sometimes known in the art), or that it include a sufficient power difference to qualify as a "spike" (as sometimes known in the art). For example, an ACK (acknowledgement) message by the AP 130 would be adequate to destroying the frame 200.

This action by the AP 130 has the effect that, even if the frame 200 is successfully routed to its destination device, the frame payload 220 will not match the frame checksum 230. This has the effect that destination device will discard the frame 200 as broken. Even if the destination device does not discard the frame 200, at least some portion of the frame payload 220 will have been eradicated by collision with the "noise spike" (as described above) from the AP 130.

A flow point 310B defines an end of the method 300.

Generality of the Invention

This invention should be read in the most general possible form. This includes, without limitation, the following possibilities included within the scope of, or enabled by, the invention.

Alternative embodiments are also applicable to non-802.11 protocols, and are particularly useful in environments where the digital protocol involves commutativity of channels between transmitter and receiver.

Alternative embodiments also apply to directional antennae and can support flexible antenna configurations, for example, directional antennae, sectorized antennae, antennae with different azimuth patterns, antennae with different vertical patterns, and the like.

Alternative embodiments support different radios having different transmit power and receive power, with the effect of providing different coverage planning on different channels.

Alternative embodiments provide for use of CSMA/CD protocols as well as CSMA/CA protocols.

Alternative embodiments provide for antennae that are deployed and coupled, for example, using backhauling, to AP's that might be relatively non-local.

Alternative embodiments are also applicable in cases in which it is desired to enforce a "no wireless communication at all" policy, such as for example in enterprises in which wireless communication is deemed inherently unsafe (for electronic reasons, such as for example in a medical facility) or against security policy (such as for example in a financial institution).

After reading this application, those skilled in the art would see the generality of this application.

The invention claimed is:

1. A method, including steps of, in a wireless communication system,
    at one or more access points, servicing authorized devices from time to time;
    at those access points receiving authorization information from a network controller, said network controller providing said authorization information to a $1^{st}$ and a $2^{nd}$ access point;
    at said $1^{st}$ and $2^{nd}$ access points, scanning for unauthorized devices when not servicing authorized devices;
    at said $1^{st}$ and $2^{nd}$ access points, detecting those unauthorized devices before completion of a single message therefrom, in response to said authorization information; and
    at one or more access points, switching dynamically between servicing authorized devices and breaking frames from or to unauthorized devices.

2. A method, including steps of, in a wireless communication system,
    at one or more access points, servicing authorized devices from time to time;
    at those access points receiving authorization information from a network controller, said network controller providing said authorization information to a $1^{st}$ and a $2^{nd}$ access point;
    at said $1^{st}$ and $2^{nd}$ access points, scanning for unauthorized devices when not servicing authorized devices;
    at said $1^{st}$ and $2^{nd}$ access points, detecting those unauthorized devices before completion of a single message therefrom, in response to said authorization information;
    in response to those steps of scanning, breaking frames from or to unauthorized devices; and
    determining whether a sufficient duration remains before returning to servicing authorized devices.

3. A method, including steps of, in a wireless communication system,
    at one or more access points, servicing authorized devices from time to time;
    at those access points receiving authorization information from a network controller, said network controller providing said authorization information to a $1^{st}$ and a $2^{nd}$ access point;
    at said $1^{st}$ and $2^{nd}$ access points, scanning for unauthorized devices when not servicing authorized devices;
    at said $1^{st}$ and $2^{nd}$ access points, detecting those unauthorized devices before completion of a single message therefrom, in response to said authorization information;
    in response to those steps of scanning, breaking frames from or to unauthorized devices;
    determining whether a sufficient duration remains before returning to servicing authorized devices; and
    in response to those steps of determining, either returning to those steps of servicing or returning to those steps of scanning.

4. A method, including steps of, in a wireless communication system, listening for L1 protocol messages on a particular channel, said channel being indicated by a network controller, said network controller being coupled to at least a $1^{st}$ and a $2^{nd}$ access point; and in response to a receiver, jamming L1 protocol messages on that particular channel, said messages each having an associated sender, for all devices except the sender and receiver by deliberately emitting an interfering signal, said interfering signal operating to jam said L1 protocol messages before their completion.

5. A method as in claim 4, wherein that channel includes a broadcast electromagnetic medium.

6. A method as in claim 4, wherein that channel includes a wireless communication medium.

7. A method as in claim 4, wherein those steps of listening and jamming collectively include steps of listening to a portion of a particular protocol message; and causing at least some data delivered by that particular protocol message to be erased or overwritten during the time it is communicated wirelessly.

8. A method as in claim 7, wherein those steps of causing data to be erased or overwritten include steps of causing a collision between that particular message and a signal external to that particular message.

9. A method as in claim 7, wherein those steps of causing data to be erased or overwritten include steps of emitting a signal that collides with that particular message, whereby listeners to that particular message receive a composite of that signal and that particular message.

* * * * *